US007139656B1

(12) United States Patent
Mladenovic

(10) Patent No.: US 7,139,656 B1
(45) Date of Patent: Nov. 21, 2006

(54) MASS AIRFLOW RATE PER CYLINDER ESTIMATION WITHOUT VOLUMETRIC EFFICIENCY MAP

(75) Inventor: Ljubisa M. Mladenovic, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/300,532

(22) Filed: Dec. 14, 2005

(51) Int. Cl.
*F02D 41/02* (2006.01)
*G06F 17/00* (2006.01)

(52) U.S. Cl. .................................... 701/102; 73/117.3

(58) Field of Classification Search ................ 701/102, 701/101, 104, 107, 110, 114; 73/117.3, 116, 73/118.2

See application file for complete search history.

(56) References Cited

U.S. PATENT DOCUMENTS 5,803,608 A * 9/1998 Randoll et al. ............ 73/118.2
5,992,379 A * 11/1999 Brudigam et al. .......... 701/107
6,886,399 B1 * 5/2005 Schnaibel et al. ......... 73/118.2
6,959,254 B1 * 10/2005 Reuschenbach et al. ... 73/117.3
6,985,806 B1 * 1/2006 Stadler ....................... 701/102

* cited by examiner

*Primary Examiner*—Hieu T. Vo
(74) *Attorney, Agent, or Firm*—Christopher DeVries

(57) ABSTRACT

A method of dynamically determining a mass airflow per cylinder in order to control operation of an internal combustion engine includes first initializing a mass airflow per cylinder (MAC) value. A manifold pressure (MAP) signal, a mass airflow (MAF) signal, and an induction air temperature (IAT) signal is then received. An estimated manifold pressure is calculated from the MAF, the IAT, and the initialized MAC. A filter is applied to the MAP. A manifold pressure error is determined from the estimated manifold pressure and the filtered manifold pressure. A product is computed of the manifold pressure error and the initialized MAC. The product is adapted. A mass airflow per cylinder is computed, as a second product, based on the adapted product and the initialized MAC. Engine operation is controlled based on the mass airflow per cylinder.

22 Claims, 3 Drawing Sheets

MASS AIRFLOW RATE PER CYLINDER ESTIMATION WITHOUT VOLUMETRIC EFFICIENCY MAP

FIELD OF THE INVENTION

The present invention relates to a mass air flow system for an internal combustion engine, and more particularly to systems and methods for determining a mass airflow per cylinder of the internal combustion engine.

BACKGROUND OF THE INVENTION

Various methods for determining mass airflow per cylinder for an internal combustion engine exist. One common method for dynamically calculating a mass airflow per cylinder uses volumetric efficiency. This method requires volumetric efficiency tables that characterize engine breathing.

As defined, volumetric efficiency tables require a considerable amount of controller memory. Each value in the table must be individually calibrated to meet different engine characteristics. Once calibrated the volumetric efficiency tables are not always an accurate representation of engine breathing during transient operations. Eliminating the volumetric efficiency tables would be advantageous to the mass air per cylinder determination.

SUMMARY OF THE INVENTION

Accordingly, a method of dynamically determining a mass airflow per cylinder in order to control operation of an internal combustion engine includes first initializing a mass airflow per cylinder (MAC) value. A manifold pressure (MAP) signal, a mass airflow (MAF) signal, and an induction air temperature (IAT) signal is then received. An estimated manifold pressure is calculated from the MAF, the IAT, and the initialized MAC. A filter is applied to the MAP. A manifold pressure error is determined from the estimated manifold pressure and the filtered manifold pressure. A product is computed of the filtered manifold pressure error and the initialized MAC. The product is adapted. A mass airflow per cylinder is computed, as a second product, based on the adapted product and the initialized MAC. Engine operation is controlled based on the mass airflow per cylinder.

In other features, the method includes calculating an estimated manifold pressure based on the IAT, the MAC value, the MAF, a gas constant R, and a manifold volume value $V_{man}$. The method of calculating an estimated manifold pressure is based on the following mathematical model:

$$\frac{dP}{dt} = \frac{R}{V_{man}} * IAT * (MAF - MAC).$$

In still other features, the method includes calculating an estimated manifold pressure based on the IAT, a previously determined mass airflow per cylinder (MAC), the MAF, a gas constant R, and a manifold volume value $V_{man}$.

In yet another feature, the method of determining comprises subtracting the filtered manifold pressure from the estimated manifold pressure.

In yet another feature, the method of adapting comprises applying an integration with a gain value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
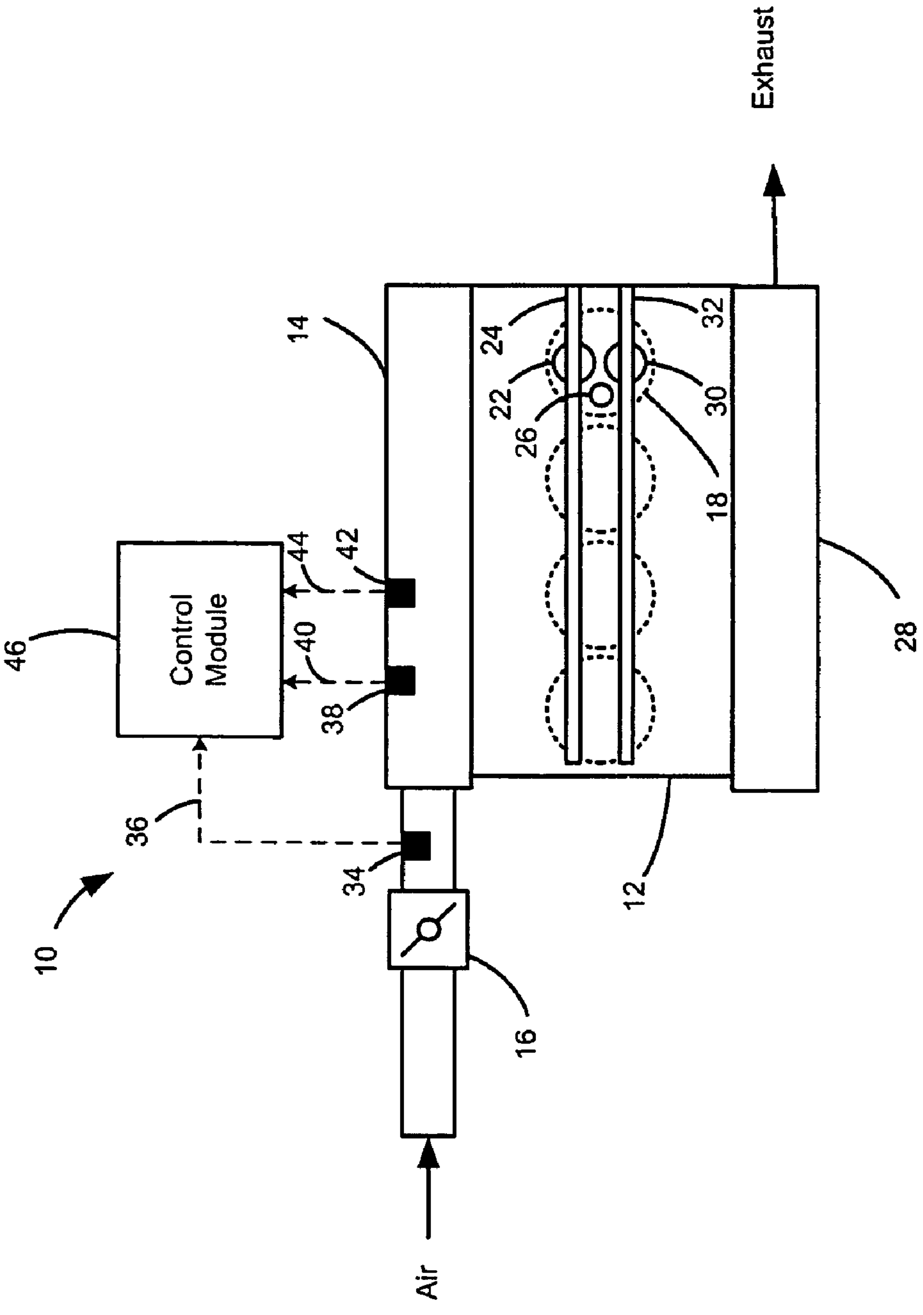
FIG. 1 is a functional block diagram illustrating an internal combustion engine system.

The following description of the preferred embodiment(s) is merely exemplary in nature and is in no way intended to limit the invention, its application, or uses. For purposes of clarity, the same reference numbers will be used in the drawings to identify the same elements. As used herein, the term module and/or device refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although four cylinders 18 are illustrated, it can be appreciated that the engine can have a plurality of cylinders including, but not limited to, 2, 3, 5, 6, 8, 10, 12 and 16 cylinders.

A fuel injector (not shown) injects fuel that is combined with the air as it is drawn into the cylinder 18 through an intake port. An intake valve 22 selectively opens and closes to enable the air/fuel mixture to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust is treated in an exhaust system (not shown). Although single intake and exhaust valves 22,30 are illustrated, it can be appreciated that the engine 12 can include multiple intake and exhaust valves 22,30 per cylinder 18.

An exhaust gas recirculation (EGR) system (not shown) can also be included in the system. The EGR system includes an EGR valve that regulates exhaust flow back into the intake manifold 14. The EGR system is generally implemented to regulate emissions. However, the mass of exhaust air that is recirculated back into the intake manifold

14 also reduces the temperature of the air in the manifold and affects engine torque output.

A mass airflow (MAF) sensor 34 senses the mass of intake airflow into the system and generates a MAF signal 36. An induction air temperature (IAT) sensor 38 senses a temperature of intake air and generates an IAT signal 40. A manifold absolute pressure (MAP) sensor 42 senses the pressure within the intake manifold and generates a MAP signal 44. A control module 46 determines a mass airflow per cylinder (MAC) based on the sensor signals 36, 40, and 44. The determined MAC is then used by the engine system 10 to control engine operation. For example, fuel delivery can be controlled based on the determined mass air per cylinder.

Figure 2:
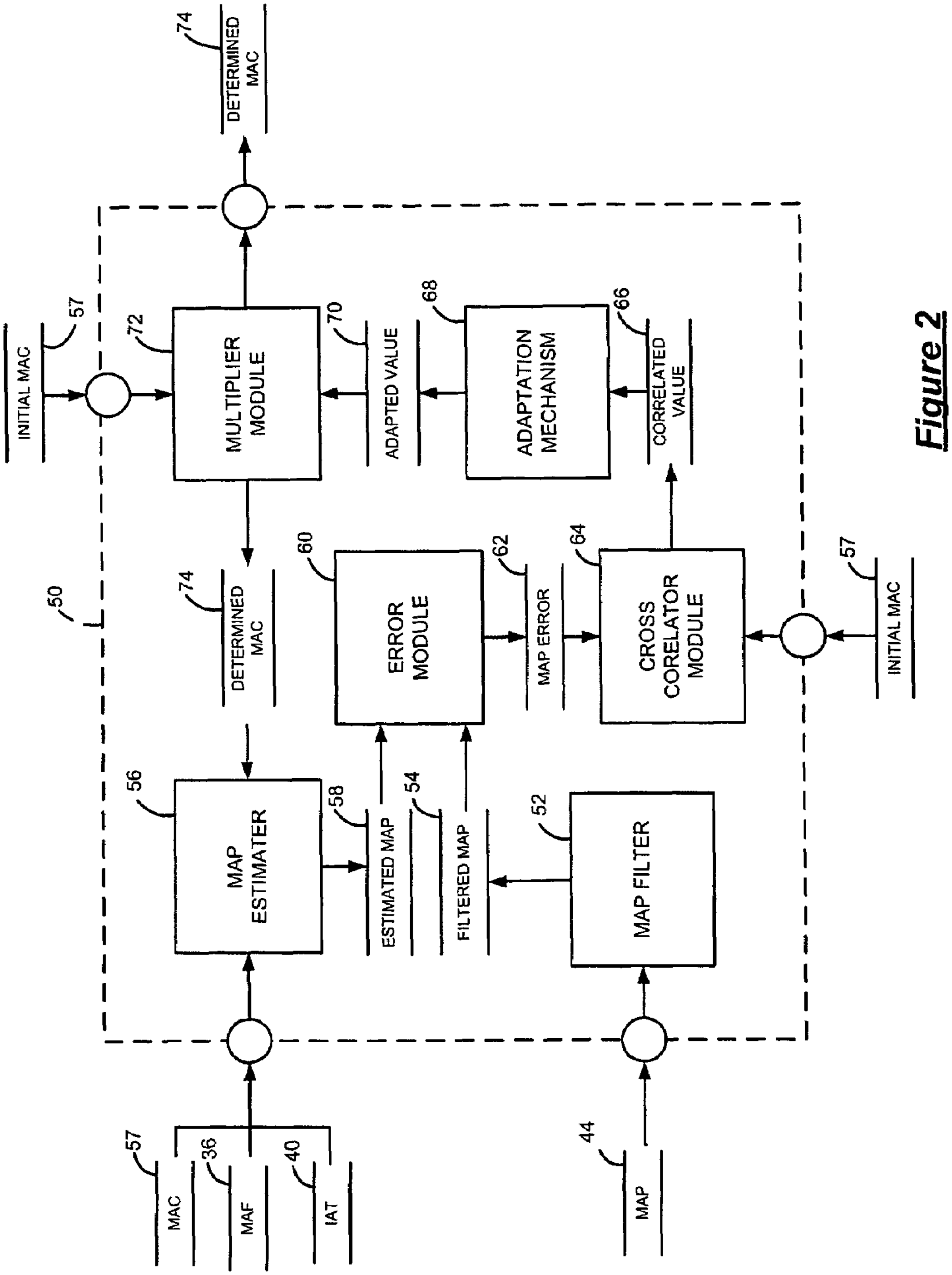
FIG. 2 is a dataflow diagram illustrating the flow of data for a mass airflow per cylinder determination module.

Referring now to FIG. 2, a subsystem of the control module (46 of FIG. 1) responsible for determining MAC is shown at 50. The MAC module 50 receives the MAP signal 44, the MAF signal 36, and the IAT signal 40. MAC module 50 determines a MAC without using volumetric efficiency tables. Instead, the MAC module 50 uses the mathematical model of adiabatic manifold filling dynamics and the following manifold pressure state equation:

$$\frac{dP}{dt} = \frac{R}{Vman} * Tman * \left(\frac{dmt}{dt} - \frac{dmc}{dt}\right).$$

Where, R is a gas constant and $V_{man}$ is the volume of the intake manifold. These values are nearly constant and are determined by the size and type of engine. $T_{man}$ is the manifold absolute temperature. Dmt/dt is the airflow rate through the throttle blade (MAF) and dmc/dt is the airflow rate into the engine (MAC).

More specifically, a MAP Filter module 52 receives the MAP signal 44 and applies a filter to the signal. The filter removes erroneous fluctuations in the signal to due to noise in the system. MAP Filter module 52 outputs a filtered MAP 54. MAP estimator module 56 receives the MAF signal 36, the IAT signal 40, and an initial MAC value 57. The initial MAC value 57 is an initial estimation of the mass air per cylinder. The initial MAC value 57 can be initialized to any value not equal to zero. On subsequent determinations of mass airflow per cylinder, MAP estimator module receives a determined MAC as input. Based on the received inputs, MAP estimator module 56 calculates an estimated MAP 58 using the manifold pressure state equation mentioned above with IAT, MAF and one of the two received MAC values as inputs. The following equation shows the relation.

$$\frac{dP}{dt} = \frac{R}{V_{man}} * IAT * (MAF - MAC).$$

The MAP estimator module 56 uses the initial MAC value on a first time determination and uses the determined MAC upon subsequent determinations of the mass airflow per cylinder.

Error module 60 computes an error of the estimated manifold pressure based on the filtered MAP 54 and the estimated MAP 58 where MAP error 62 equals filtered MAP 54 minus the estimated MAP 58. Cross correlator module 64 receives the MAP error 62 and applies it to the initial MAC value 57 where correlated value 66 equals the initial MAC value 57 multiplied by the MAP error 62. Adaptation module 68 receives the correlated value 66 and applies integration with a suitable gain to the correlated value 66. Adapted value 70 is transferred to the multiplier module 72 where the adapted value 70 is multiplied by the initial MAC to equal determined MAC 74. Determined MAC 74 is then transferred to the MAP estimator module 56 for use in the next determination of MAC and is also output to other modules of the control module (46 of FIG. 1) that control engine operation.

Figure 3:
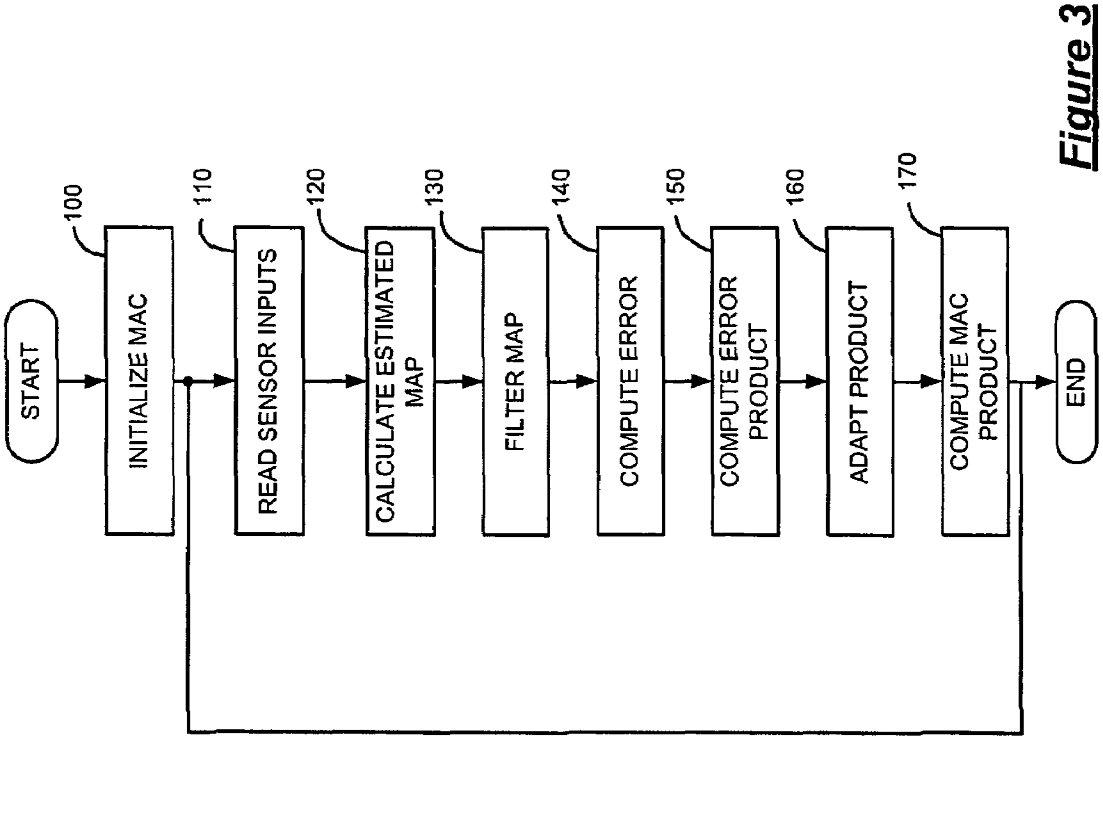
FIG. 3 is a flowchart illustrating steps executed by the mass airflow per cylinder determination module when determining mass airflow per cylinder.

Referring now to FIG. 3, a flowchart illustrating steps for dynamically determining MAC is shown. In step 100, the initial MAC value is initialized. The value can be initialized to an initial selectable value not equal to zero. In step 110 sensor signals for IAT, MAF, and MAP are received. In step 120, the estimated MAP is calculated based on the MAF signal, the IAT signal, and the initial MAC or the determined MAC. Step 120 calculates the estimated map based on the developed manifold state equation model as stated above. In step 130, a filter is applied to the MAP signal. In step 140 a MAP error is determined from the estimated MAP and the filtered MAP as stated above. In step 150, the product of MAP Error and the initial MAC is computed. In step 160, the product of step 150 is then adapted by integrating the value with a suitable gain. In step 170, the adapted product is then multiplied by the initial MAC. The product results in the mass air per cylinder value used in controlling engine system operation. After step 170, control loops back to step 110. The steps of FIG. 3 are continually run during an engine cycle. The determined MAC will converge to the 'true' MAC within few cycles.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system for determining a mass airflow per cylinder of an internal combustion engine with an intake manifold, comprising:

a first signal input device that receives a manifold pressure (MAP) signal based on an absolute pressure of the intake manifold;

a second signal input device that receives a mass airflow (MAF) signal based on the mass of airflow entering the engine;

a third signal input device that receives an induction air temperature (IAT) signal based on the temperature of air in the intake manifold of the engine; and a processor that receives said MAP signal, said MAF signal, and said IAT signal and that filters said MAP signal, calculates an estimated MAP value based on an initial mass airflow per cylinder (MAC) value, said MAF signal, and said IAT signal and determines a mass airflow per cylinder based on said filtered MAP, said estimated MAP, and said initial MAC value.

2. The system of claim 1 wherein said processor calculates said estimated MAP based on a gas constant R, a manifold volume $V_{man}$, said IAT signal, said MAF signal, and an initial MAC value.

3. The system of claim 2 wherein said processor calculates an estimated MAP based on the following equation:

$$\frac{dP}{dt} = \frac{R}{V_{man}} * IAT * (MAF - MAC).$$

4. The system of claim 1 wherein said processor calculates said estimated MAP based on a gas constant R, a manifold volume $V_{man}$, said IAT signal, said MAF signal, and a previously determined mass airflow per cylinder.

5. The system of claim 1 wherein said initial MAC value is initialized to a value not equal to zero.

6. The system of claim 1 wherein said processor determines a MAP error by subtracting said filtered MAP from said estimated MAP, and wherein said processor determines said mass airflow per cylinder by computing a product of said error and said initial MAC value, adapting said product by applying a gain to said product, and computing a second product from said adapted value and said initial MAC, wherein said product is set equal to said mass airflow per cylinder.

7. The system of claim 1 further comprising a signal generating device that generates a fuel signal based on said mass airflow per cylinder.

8. A system for determining a mass airflow per cylinder of an internal combustion engine with an intake manifold, comprising:

a mass airflow sensor that generates a mass airflow signal based on a mass of air entering the engine;

a manifold pressure sensor that generates a manifold absolute pressure signal based on air pressure in the intake manifold;

an induction air temperature sensor that generates an induction air temperature signal based on a temperature of the air in the intake manifold; and a controller that receives said mass airflow signal, said manifold absolute pressure signal, and said induction air temperature signal and that determines a mass airflow per cylinder based on said mass airflow signal, said manifold absolute pressure signal, and said induction air temperature signal as inputs to a manifold pressure state equation and that controls engine operation based on said mass airflow per cylinder.

9. The system of claim 8 wherein said controller initializes a mass air per cylinder initial value and determines said mass air per cylinder based on said mass air per cylinder initial value, said mass airflow signal, said manifold absolute pressure signal and said induction air temperature signal.

10. The system of claim 9 wherein said controller calculates an estimated manifold pressure based on said induction air temperature (IAT), said mass airflow (MAF), and said initial mass airflow per cylinder (MAC), a gas constant (R), and a manifold volume ($V_{man}$) and based on the following equation:

$$\frac{dP}{dt} = \frac{R}{V_{man}} * IAT * (MAF - MAC).$$

11. The system of claim 10 wherein said controller applies a filter to said manifold pressure, computes an error based on said filtered manifold pressure and said estimated manifold pressure, applies said error to said initial mass airflow per cylinder value, and adapts said initial mass airflow per cylinder value by applying said gained value.

12. The system of claim 9 wherein said controller calculates an estimated manifold pressure based on said induction air temperature (IAT), said mass airflow (MAF), a product of said initial mass airflow per cylinder and said determined mass airflow per cylinder (MAC), a gas constant (R), and a manifold volume ($V_{man}$) and based on the following equation:

$$\frac{dP}{dt} = \frac{R}{V_{man}} * IAT * (MAF - MAC).$$

13. The system of claim 8 wherein said controller initializes said mass air per cylinder initial value to a value not equal to zero.

14. The system of claim 8 wherein said controller controls fuel delivered to cylinders of the engine based on said mass airflow per cylinder.

15. A method of dynamically determining a mass airflow per cylinder in order to control operation of an internal combustion engine, comprising:

initializing a mass airflow per cylinder (MAC) value;

receiving a manifold pressure (MAP) signal, a mass airflow (MAF) signal, and an induction air temperature (IAT) signal;

calculating an estimated manifold pressure from said MAF, said IAT, and said initialized MAC;

applying a filter to said MAP;

determining a manifold pressure error from said estimated manifold pressure and said filtered manifold pressure;

computing a product of said manifold pressure error and said initialized MAC; and adapting said product;

computing a mass airflow per cylinder based on a second product of said adapted product and said initialized MAC; and controlling engine operation based on said mass airflow per cylinder.

16. The method of claim 15 wherein calculating an estimated manifold pressure is based on said IAT, said MAC value, said MAF, a gas constant R, and a manifold volume value $V_{man}$.

17. The method of claim 16 wherein calculating an estimated manifold pressure is based on the following equation:

$$\frac{dP}{dt} = \frac{R}{V_{man}} * IAT * (MAF - MAC).$$

18. The method of claim 15 wherein calculating an estimated manifold pressure is based on said IAT, a previously determined mass airflow per cylinder (MAC), said MAF, a gas constant R, and a manifold volume value $V_{man}$.

19. The method of claim 15 wherein said initial MAC value is initialized to a value not equal to zero.

20. The method of claim 15 wherein said determining comprises subtracting said filtered manifold pressure from said estimated manifold pressure.

21. The method of claim 15 wherein said adapting comprises applying an integration with a gain value.

22. The method of claim 15 further comprising controlling fuel delivery to the internal combustion engine based on said computed mass airflow per cylinder.

* * * * *